May 5, 1953　　　C. KLEIN ET AL　　　2,637,283
UNIT HEATING SYSTEM FOR BAKING OVENS
Filed March 18, 1949　　　3 Sheets-Sheet 1

Inventors:
Chris Klein
Richard C. Skarin
William G. Tinker
By Bair & Freeman
Attys.

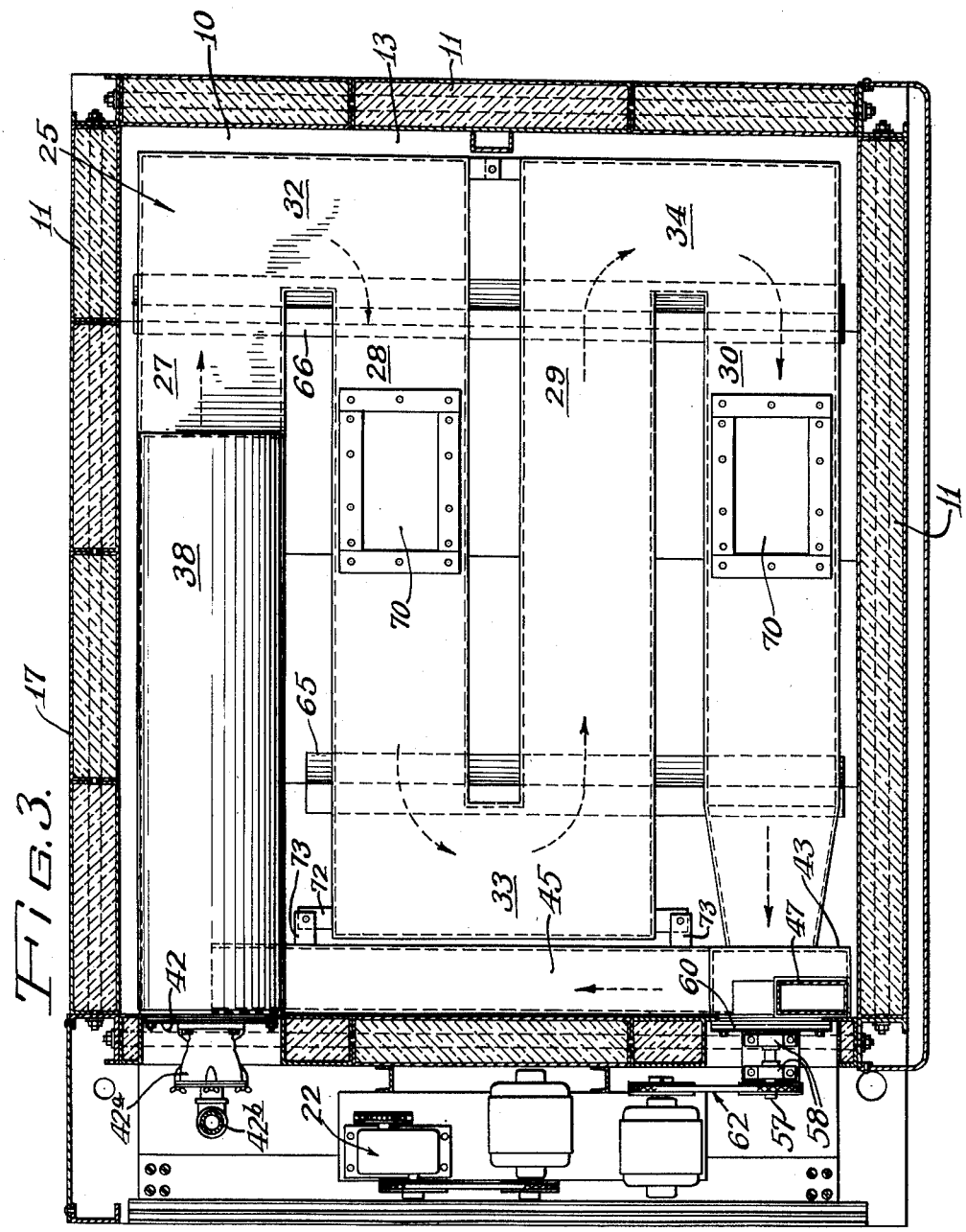

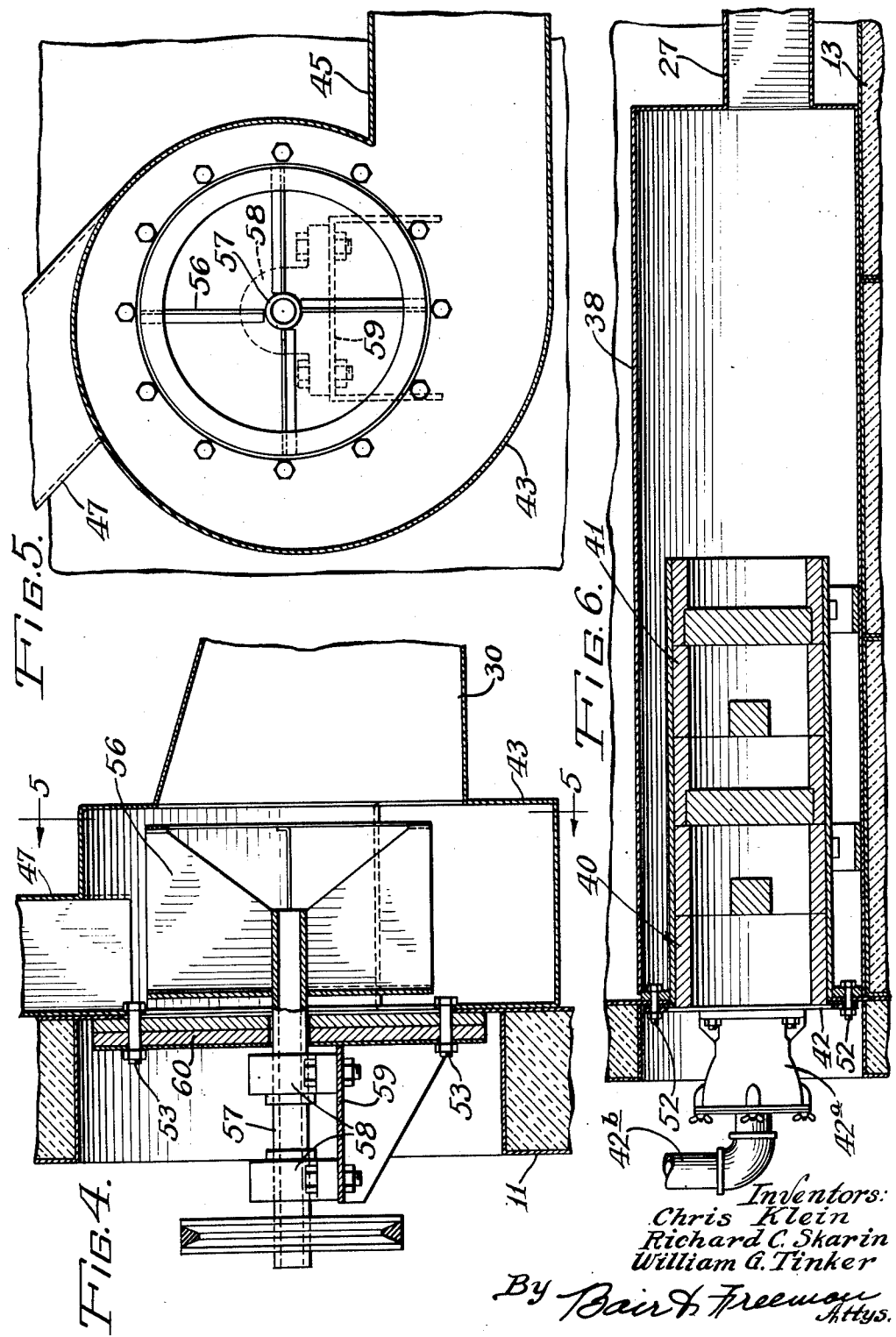

Patented May 5, 1953

2,637,283

UNITED STATES PATENT OFFICE 2,637,283

UNIT HEATING SYSTEM FOR BAKING OVENS

Chris Klein, Warrenville, Richard C. Skarin, Western Springs, and William G. Tinker, Itasca, Ill., assignors to The Petersen Oven Company, Franklin Park, Ill., a corporation of Illinois Application March 18, 1949, Serial No. 82,224

1 Claim. (Cl. 107—63)

The present invention pertains to baking ovens of the commercial type, wherein power driven means is provided within the baking chamber for moving of foodstuffs or other materials to be baked within the chamber from a loading station to an unloading station, or wherein the power driven means and the oven proper are constructed so that the loading and unloading is effected at the same place.

Heretofore, it has been the general practice in the manufacture of such ovens, to produce the various elements and components of the oven and preassemble them at the factory as a substantially complete oven, and then disassemble the oven and ship it to the site for final erection. The purpose of so producing the ovens has been with a view to reducing labor in the "field" and facilitate the final assembly of parts, particularly in view of the fact that the nature of the tools and equipment available to the erection mechanics in the "field" is generally not of such form as to permit proper and efficient operations on various sheet metal parts and components to take care of unforeseen difficulties at the site of erection. Furthermore, such preassembly of the oven at the factory permits testing to a limited extent as to operation. After the preassembly of the oven at the factory it is "knocked down" and the various elements or components are then shipped to the site for final assembly and erection. Such practice in producing commercial baking ovens has resulted in great consumption of man hours of time, as well as heavy production costs.

The present invention is directed to improvements in heating systems, of the indirect type, for use in such ovens. Heretofore, the heating system for such ovens comprised a multiplicity of ducts or conduits such as pipes and other components which are shipped disassembled to the site for final erection. Due to the non-availability of proper equipment and tools at the site of erection as compared with the equipment and tools available in the manufacturing plant, there results a great consumption of man hours in properly assembling the elements in the "field," and which also necessitates expenditure of considerable time in careful testing and checking of the heating system for insuring proper functioning thereof.

One of the primary objects of this invention is to provide a prefabricated unitary heat exchanger, for an indirect type of heating system of a baking oven which is adapted to be produced and assembled in final form at the factory for insuring uniformity of production and construction and satisfactory performance.

Another object is to provide a novel form of heat exchanger for baking ovens, produced as a prefabricated unitary structure, and which results in substantial saving in man hours as compared to conventional manufacture and assembly of such devices in the "field."

A further object is to provide a novel heat exchanger unit for an indirect heating system of a baking oven, formed as a prefabricated unitary assembly and comprising a series of interconnected duct sections arranged side-by-side and interconnected in series relation to form a continuous conduit; the free end of one of the duct sections being formed to provide a chamber for a fluid fuel heater unit, and the other free end of the duct system being formed to provide a housing for a suction-blower, and the chamber and the housing being interconnected by a duct section for effecting recirculation of a portion of the heated air in the system.

A still further object is to provide a prefabricated unitary heat exchanger for an indirect heating system of a baking oven which is durable in construction, efficient in operation, and capable of being economically manufactured.

Other objects and advantages of this invention will be apparent from the following description, taken in connection with the accompanying drawings in which:

Figure 3 is a horizontal sectional view through the oven showing the heat exchanger in plan view;

Figure 4 is an enlarged vertical section through the suction-blower end of the heat exchanger, taken substantially as indicated at line 4—4 on Figure 1;

Figure 5 is a sectional view through the suction-blower housing, taken as indicated at line 5—5 on Figure 4; and Figure 6 is an enlarged vertical section, taken substantially as indicated at line 6—6 on Figure 1, showing a heater unit mounted within the chambered end of the heat exchanger unit.

Figure 1:
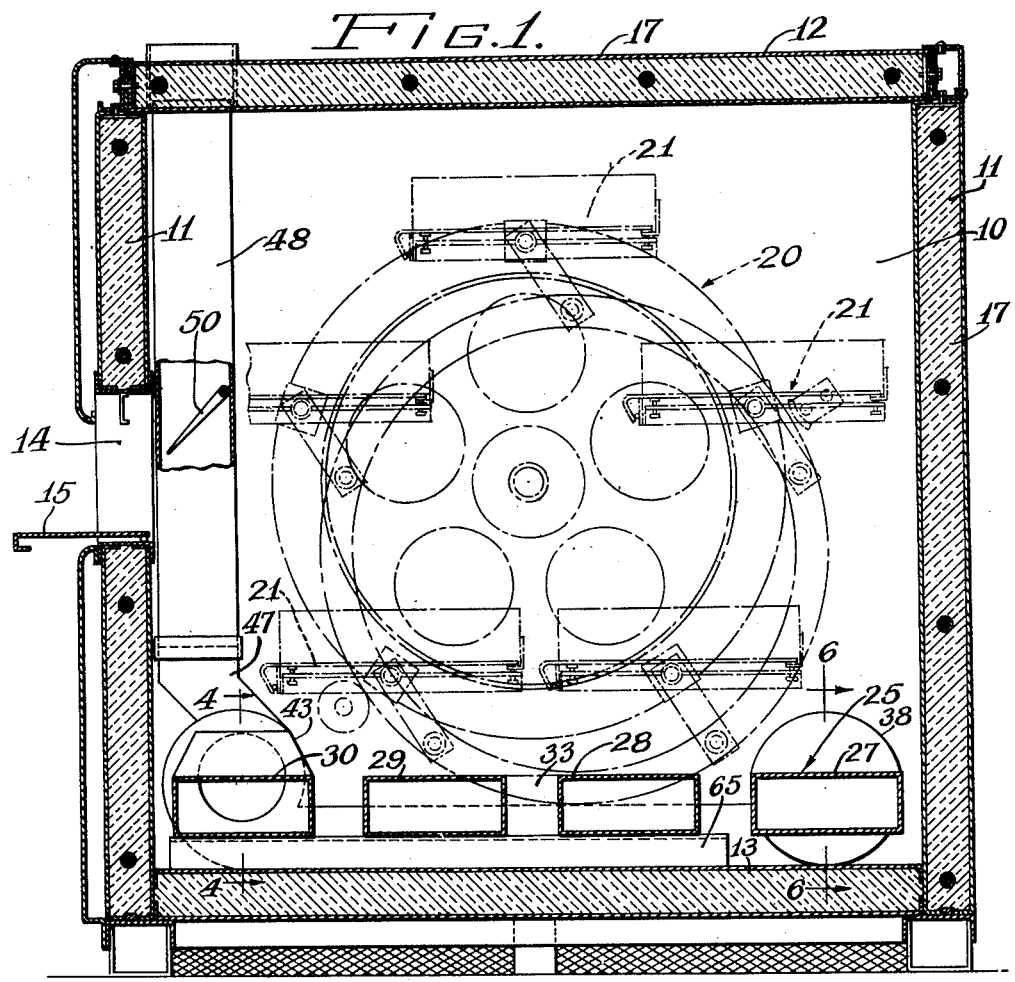
Figure 1 is a vertical transverse sectional view through a baking oven, provided with a heating system embodying the present invention.

In the drawings, we have shown the present invention as adapted to a "reel type" oven by way of illustration, and it will be apparent that the present invention may be adapted for use in connection with other types of baking ovens. As shown in the drawings, the oven comprises a walled enclosure defining a baking chamber 10. The walled enclosure is composed of four side walls 11, a top wall 12 and a bottom wall 13. The front side wall is formed with a horizontally extending, elongated opening 14 through which the materials to be baked are introduced into and when baked, removed from the baking chamber 10. The opening is adapted to be closed by a hinged door as indicated at 15.

The walls comprising the enclosure as shown in the drawings are each composed of a plurality of prefabricated unitary panel assemblies, as indicated at 17, which are produced as complete components at the factory, and shipped to the site and assembled in the final erection of the oven, and thus serve to effect economies in production and assembly. The panel construction comprising the walled enclosure of the oven constitutes the subject matter of our co-pending application Serial No. 77,522, filed February 21, 1949.

Mounted within the baking chamber 10 is a reel structure indicated at 20, in dot and dash outline, comprising a plurality of circumferentially spaced apart trays 21 for supporting the material to be baked within the chamber 10. The total reel assembly is adapted to be rotated about a substantially horizontally extending axis, by suitable drive mechanism such as indicated generally at 22. In a "reel type" of oven it is to be understood that the material, as for example, foodstuffs, when positioned on the respective trays, travels in a circular path in the baking chamber for a predetermined period of time for effecting a proper baking operation thereon. In baking ovens as currently manufactured and sold, the heating systems, in the main, are of the indirect heat type, and generally employ hot air as the heating medium. Such heating systems include a series of ducts suitably arranged within the baking chamber, and the main heat transmitting ducts are usually located adjacent the bottom of the chamber.

Figure 2:
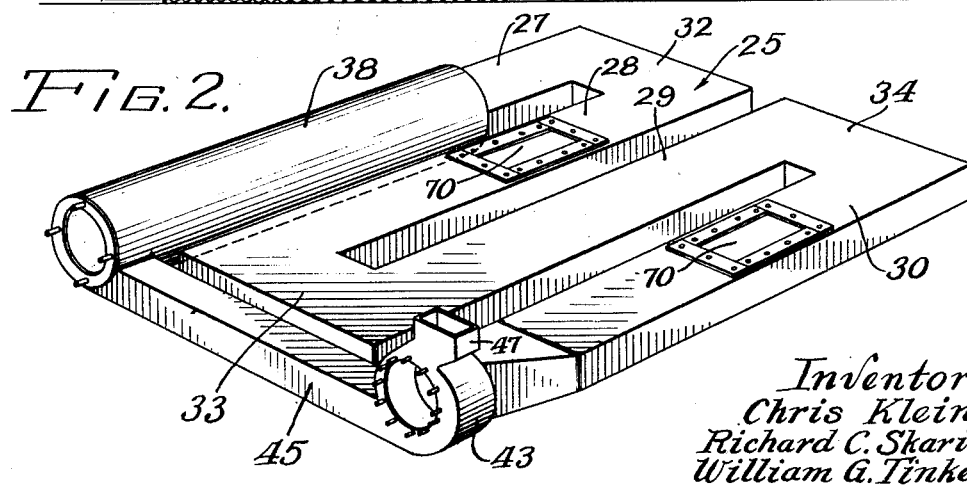
Figure 2 is a perspective view of the heat exchanger unit constituting the present invention.

The heating system of the present invention comprises a heat exchanger indicated generally at 25, mounted adjacent the bottom wall 13 of the baking chamber. As may be seen in Figure 2 of the drawings, the heat exchanger is a prefabricated, unitary assembly comprising a plurality of duct sections 27, 28, 29 and 30 arranged side-by-side in substantially parallel, spaced apart relation, and the adjacent ends of the respective ducts are interconnected by end portions 32, 33 and 34 so that all of the duct sections are in series relation and constitute a continuous, sinuous conduit or duct, and the path of flow of hot air through the conduit is indicated by arrows in Figure 3 of the drawings. The duct sections in the main, as shown in the drawings, are of rectangular cross section, but may be of any other desired or convenient configuration. The duct section 27, at its free portion, merges into and constitutes a continuation of a chamber 38, herein shown as of cylindrical form, in which is mounted, when the heat exchanger is assembled in final position within the baking chamber, a fluid fuel heater unit, indicated generally at 40. The fluid fuel heater unit, as shown in Figure 6 of the drawings includes a ceramic lining 41 and suitable baffles for the efficient combustion of gaseous fuels. In the event liquid fuel is to be employed, the heater unit may be of modified construction for insuring proper and efficient combustion, as is well understood in the art. The end of the chamber is closed by a plate 42 to which is attached a suitable nozzle head, indicated at 42a connected to a gas supply conduit 42b.

The free end portion of the duct section 30 merges into a housing 43 of a suction-blower unit. Said housing 43 and cylinder chamber 38 are interconnected by a duct section 45 for recirculating within the heating system a portion of the hot air of the system and thus insuring efficient operation.

The suction-blower housing also is provided with an upwardly extending duct section 47, which is connected to an upwardly extending vent or stack 48. Mounted within the vent duct or stack 48, as seen in Figure 1 of the drawings, is a suitable damper 50, adapted to be adjusted as desired for controlling the extent of spillage or discharge of the hot air from the heating system for assisting in controlling the temperatures of the baking chamber, as well as insuring efficient fuel combustion by the introduction of adequate fresh air into the heating system.

The end of the cylindrical chamber 38 is attached to plate 42 and the suction-blower housing 43 is attached to the end plates 60 by bolts as indicated at 52 and 53, respectively, passing through the side wall of the oven, as seen in Figures 4 and 6 of the drawings.

Positioned within the suction-blower housing is a vaned impeller element 56 having a tubular shaft 57 mounted in suitable bearings 58 carried on a supporting bracket 59, which is attached to the end panels 60 which serve as a closure for the outer end of the suction-blower housing, as clearly seen in Figure 4 of the drawings. The impeller is driven in a suitable manner and as shown in Figure 3 of the drawings by the drive arrangement indicated generally at 62.

The main portion of the unitary heat exchanger is preferably supported a short distance above the bottom wall of the oven chamber, and as seen in the drawings, said exchanger is supported on the corner edge of structural angle elements 65 and 66 with the cylindrical chamber 38 and blower-housing 43 and interconnecting duct 45 resting substantially upon the bottom wall of the baking chamber.

To protect the heat exchanger from damage in the event of excessive pressure being built up within the duct system, suitable pressure relief means is provided. As shown, pressure relief means are provided in the respective duct sections 28 and 30. Each pressure relief means comprises a frame formed of four pieces of metal tacked or secured to the duct in surrounding relation to an opening formed therein. The ring or frame secures in position in registration with the opening of the duct, a metallic plate 70 of considerably lighter gauge than the frame elements, and usually considerably lighter in gauge as compared to the material from which the ducts are formed, so that in the event of excessive pressure building up in the duct system, the light gauge plate 70 will buckle to an extent that it is partially or totally withdrawn from the surrounding frame, and in the event of extremely great pressure such as may be caused by an explosion in the heating system, the plate may be blown out of the mounting frame.

As may be seen in Figure 3 of the drawings, the end portion 33 constituting the connection between duct sections 28 and 29 is disposed in spaced apart relation with respect to the connecting duct 45 between the suction-blower housing and the heat chamber 38 so as to permit a limited amount of expansion and contraction of the respective duct sections without injury thereto. For convenience in shipment, however, it is preferred that the central duct sections be rigidly connected at their free ends and for this purpose, adjacent the corners of the connecting portion 33 there is provided laterally extending lugs 72 extending in a position to cooperate with similar lugs 73, extending from the inner face of the connecting duct 45. These pairs of lugs 72 and 73 are preferably bolted together initially to insure adequate rigidity of the total heat exchanger unit for purposes of shipment and handling, and the bolts are removed after the heat exchanger is installed in the baking chamber.

It will be apparent that by virtue of the present invention the unitary heating system for a baking oven may be quickly and easily placed in position within the baking chamber and connected in place for final assembly, requiring the expenditure of a relatively small amount of time, as compared to conventional practice, and thus effecting substantial economies in the erection costs of the oven, while at the same time insuring an efficient and satisfactory operating heating system.

Although we have herein shown and described a preferred embodiment of our invention, manifestly it is capable of modification and rearrangement of parts without departing from the spirit and scope thereof. We do not, therefore, wish to be understood as limiting this invention to the precise form herein disclosed, except as we may be so limited by the appended claim.

We claim as our invention:

In a baking oven having a walled enclosure defining a baking chamber, a unitary, prefabricated heat exchanger, adapted for mounting on the lower wall of the chamber, comprising a plurality of longitudinally extending duct sections, including two outer sections and one or more intermediate sections arranged side-by-side in substantially parallel relation and interconnected at opposite ends in series relation to form a continuous conduit for the passage of heated air therethrough, the free end portion of one of the outer duct sections being formed as a chamber for the reception of a heater unit, and the free end portion of the other outer duct section being formed as a housing for a suction-blower, a separate duct interconnecting the heater chamber and the blower housing for recirculation of a portion of heated air passing through the heat exchanger, said separate duct extending transversely of and disposed adjacent to and disconnected from the ends of the intermediate duct sections, and means for externally interconnecting said separate duct and the adjacent ends of the intermediate duct sections for stability in shipment and handling.

CHRIS KLEIN.
RICHARD C. SKARIN.
WILLIAM G. TINKER.

References Cited in the file of this patent

UNITED STATES PATENTS

| Number | Name | Date |
|---|---|---|
| 1,719,684 | Besta | July 2, 1929 |
| 1,852,526 | Kemp | Apr. 5, 1932 |
| 1,857,447 | Engels | May 10, 1932 |
| 2,041,930 | Houlis | May 26, 1936 |
| 2,138,465 | Wundrack | Nov. 29, 1938 |
| 2,556,840 | Day | June 12, 1951 |

FOREIGN PATENTS

| Number | Country | Date |
|---|---|---|
| 393,818 | Great Britain | June 15, 1933 |